(12) United States Patent
Arai et al.

(10) Patent No.: US 7,380,267 B2
(45) Date of Patent: May 27, 2008

(54) POLICY SETTING SUPPORT TOOL

(75) Inventors: Masato Arai, Yokohama (JP); Satoshi Kai, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 675 days.

(21) Appl. No.: 10/688,026

(22) Filed: Oct. 17, 2003

(65) Prior Publication Data

US 2004/0193606 A1   Sep. 30, 2004

(30) Foreign Application Priority Data

Oct. 17, 2002 (JP) ............................. 2002-302439
Feb. 14, 2003 (JP) ............................. 2003-035912

(51) Int. Cl.
*G06F 17/00* (2006.01)

(52) U.S. Cl. ....................................................... 726/1
(58) Field of Classification Search ................... 726/1
See application file for complete search history.

(56) References Cited

U.S. PATENT DOCUMENTS

| | | | | |
|---|---|---|---|---|
| 5,915,085 A * | 6/1999 | Koved | ............................ | 726/1 |
| 6,044,466 A * | 3/2000 | Anand et al. | .................... | 726/1 |
| 6,158,007 A * | 12/2000 | Moreh et al. | .................... | 726/1 |
| 6,158,010 A * | 12/2000 | Moriconi et al. | ............... | 726/1 |
| 6,209,101 B1 * | 3/2001 | Mitchem et al. | ............... | 726/2 |
| 6,330,562 B1 * | 12/2001 | Boden et al. | .................. | 707/10 |
| 6,347,376 B1 * | 2/2002 | Attwood et al. | ................ | 726/1 |
| 6,393,473 B1 * | 5/2002 | Chu | ............................ | 709/223 |
| 6,466,932 B1 * | 10/2002 | Dennis et al. | .................. | 707/3 |
| 6,529,907 B1 * | 3/2003 | Terakura et al. | ................ | 707/9 |
| 6,530,024 B1 * | 3/2003 | Proctor | .......................... | 726/23 |
| 6,578,076 B1 * | 6/2003 | Putzolu | ........................ | 709/223 |
| 6,678,835 B1 * | 1/2004 | Shah et al. | .................... | 714/4 |
| 6,708,187 B1 * | 3/2004 | Shanumgam et al. | ......... | 707/201 |

(Continued)

FOREIGN PATENT DOCUMENTS

JP        2001-337864         12/2001

(Continued)

OTHER PUBLICATIONS

Venkatesan et al., Threat-Adaptive Security Policy, 1997, IEEE.*

*Primary Examiner*—Nasser Moazzami
*Assistant Examiner*—David Garcia Cervetti
(74) *Attorney, Agent, or Firm*—Townsend and Townsend and Crew LLP

(57) ABSTRACT

The policy setting support tool according to the present invention simplifies the operation required for setting up policies by providing a policy creation unit 102 and a user interface unit 101. The policy creation unit 102 creates a draft policy from a combination of sample policies prepared for each kind of software, association information providing information on the programs that are likely to access a given object, and an access log showing a history of behavior of a given program. A user interface unit 101 displays the draft policy and allows the user to check and revise it. The support tool also facilitates the maintenance of policies, by providing a differential detection unit 104 for detecting items for suggested change referring to the current object 112 and the subject information database 113, for presenting them to the user as through a user interface unit 101, and for allowing the user to revise the policy in simplified operation.

4 Claims, 15 Drawing Sheets

U.S. PATENT DOCUMENTS

| | | | |
|---|---|---|---|
| 6,715,081 B1* | 3/2004 | Attwood et al. | 707/3 |
| 6,735,701 B1* | 5/2004 | Jacobson | 726/1 |
| 6,941,472 B2* | 9/2005 | Moriconi et al. | 726/11 |
| 6,944,183 B1* | 9/2005 | Iyer et al. | 370/466 |
| 6,948,183 B1* | 9/2005 | Peterka | 725/25 |
| 6,950,818 B2* | 9/2005 | Dennis et al. | 707/3 |
| 6,985,845 B1* | 1/2006 | Pisarsky | 703/21 |
| 7,006,530 B2* | 2/2006 | Spinar et al. | 370/468 |
| 7,028,307 B2* | 4/2006 | Thiele | 719/313 |
| 7,032,022 B1* | 4/2006 | Shanumgam et al. | 709/225 |
| 7,051,107 B2* | 5/2006 | Morikawa | 709/229 |
| 7,120,931 B1* | 10/2006 | Cheriton | 726/13 |
| 7,140,035 B1* | 11/2006 | Karch | 726/1 |
| 7,207,064 B2* | 4/2007 | Fee et al. | 726/14 |
| 7,237,267 B2* | 6/2007 | Rayes et al. | 726/25 |
| 7,260,848 B2* | 8/2007 | Zimmer | 726/27 |
| 2003/0023587 A1* | 1/2003 | Dennis et al. | 707/3 |
| 2003/0093514 A1* | 5/2003 | Valdes et al. | 709/224 |
| 2003/0115322 A1* | 6/2003 | Moriconi et al. | 709/224 |
| 2003/0115484 A1* | 6/2003 | Moriconi et al. | 713/201 |
| 2003/0182475 A1* | 9/2003 | Gimenez | 710/8 |
| 2003/0226038 A1* | 12/2003 | Raanan et al. | 713/201 |
| 2004/0111643 A1* | 6/2004 | Farmer | 713/201 |
| 2004/0133777 A1* | 7/2004 | Kiriansky et al. | 713/166 |
| 2006/0010492 A9* | 1/2006 | Heintz et al. | 726/23 |

FOREIGN PATENT DOCUMENTS

JP    2002-108818    4/2002

* cited by examiner

FIG.5

| Object name | Subject information | | | | Access type | Time period |
|---|---|---|---|---|---|---|
| | Program name | Characteristic Value | User | Software name | | |
| /www/pub/* | /as/wserv.exe | 12345 | www | Attachment Server 2.0 | R | 00:00-24:00 |
| *.txt | /tools/gpad.exe | 13579 | users | Gigapad 1.0 | RW | 00:00-24:00 |
| /datafile.db | /db/hdbr.exe | 98765 | system | Hi-DB Manager 5.0 | RW | 00:00-24:00 |
| | /db/comm.exe | 43210 | system | Hi-DB Maneger 5.0 | RWD | 00:00-24:00 |
| /mail/satou/* | /m3/m3mail.exe | 91827 | satou | M3 Mail 3.0 | RWDX | 00:00-24:00 |

Check ☑ the items for which you want a sample policy.

- ☑ Attachment Server 2.0
- ☑ Gigapad 1.0
- ☑ Hi-DB Manager 5.0
- ☑ M3 Mail 3.0

Check ☑ the items for which you want association information.

- ☑ txt
- ☐ doc
- ☐ ppt
- ☐ cca

Specify the program you wish to monitor.

/as/reg.exe  [Start] [Stop]

[Create draft] [Cancel]

Procedure for creating a policy from the access log

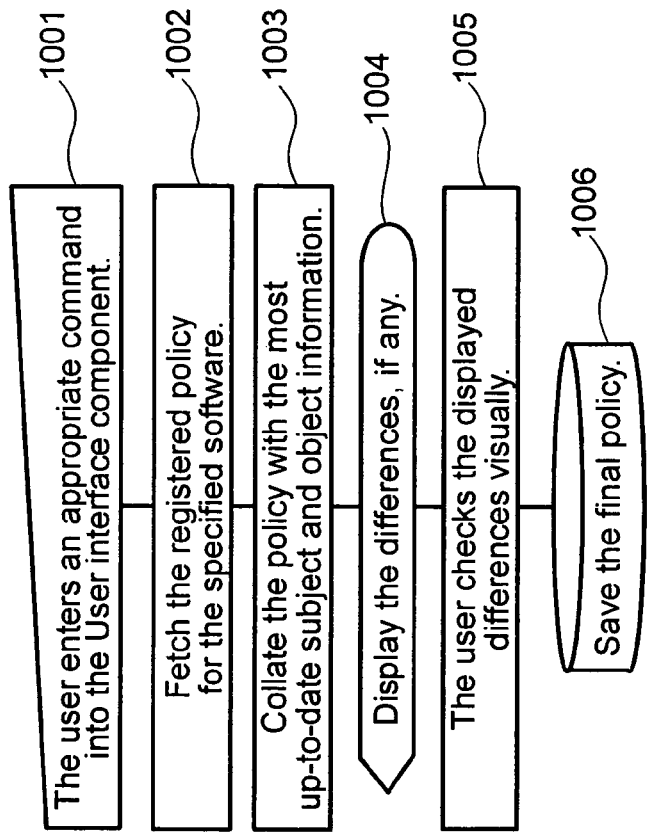

FIG.10

Procedure for Differential detection component

- 1001: The user enters an appropriate command into the User interface component.
- 1002: Fetch the registered policy for the specified software.
- 1003: Collate the policy with the most up-to-date subject and object information.
- 1004: Display the differences, if any.
- 1005: The user checks the displayed differences visually.
- 1006: Save the final policy.

FIG.11

| | Object name | Subject information | | | Access type | Time period |
|---|---|---|---|---|---|---|
| | | Program name | Characteristic value | User | | |
| Revice | /www/custom/* | /as/reg.exe | 991760 | www | RW | 08:00 - 22:00 |
| Revice | "/doc/sum.dat" does not exist | rec.exe | 54321 | users | RWD | 00:00 - 24:00 |
| Revice | /www/custom/* | /as/reg.exe | 54321 | "suzuki" does not exist | | :00 |
| Revice | /www/custom/* | "/ap/rc.exe" does not exist | | | RW | 00:00 - 24:00 |

| File name /1300 | Owner | | Access right | | |
|---|---|---|---|---|---|
| | User | Group | | | |
| /users/satou/memo.text | satou | users | RWD | RW | R |
| /users/satou/spec.doc | satou | Project A | RWD | R | R |

1310

| File type | Program name | Characteristic value | Purpose |
|---|---|---|---|
| *.txt | /tools/gpad.exe | 13579 | |
| *.doc | /ap/wordproc.exe | 12345 | |
| *.html | /ap/W3edit.exe | 98765 | |
| *.html | /ap/browser.exe | 43210 | |
| *.* | /ap/qfiler.exe | 34567 | File handling |
| *.* | /sec/cdoctor.exe | 76543 | Virus handling |
| *.* | /ap/F_recov.exe | 97531 | Backup |
| *.* | /m3/m3mail.exe | 91827 | E-mail |

FIG.14

Collate the policy with the associated information and detect the differences. — 1401

Obtain the name of the execution file from the association information. — 1402

Calculate the characteristic value and create a policy. — 1403

Display the policy. — 1404

The user edits the policy manually. — 1405

FIG.15
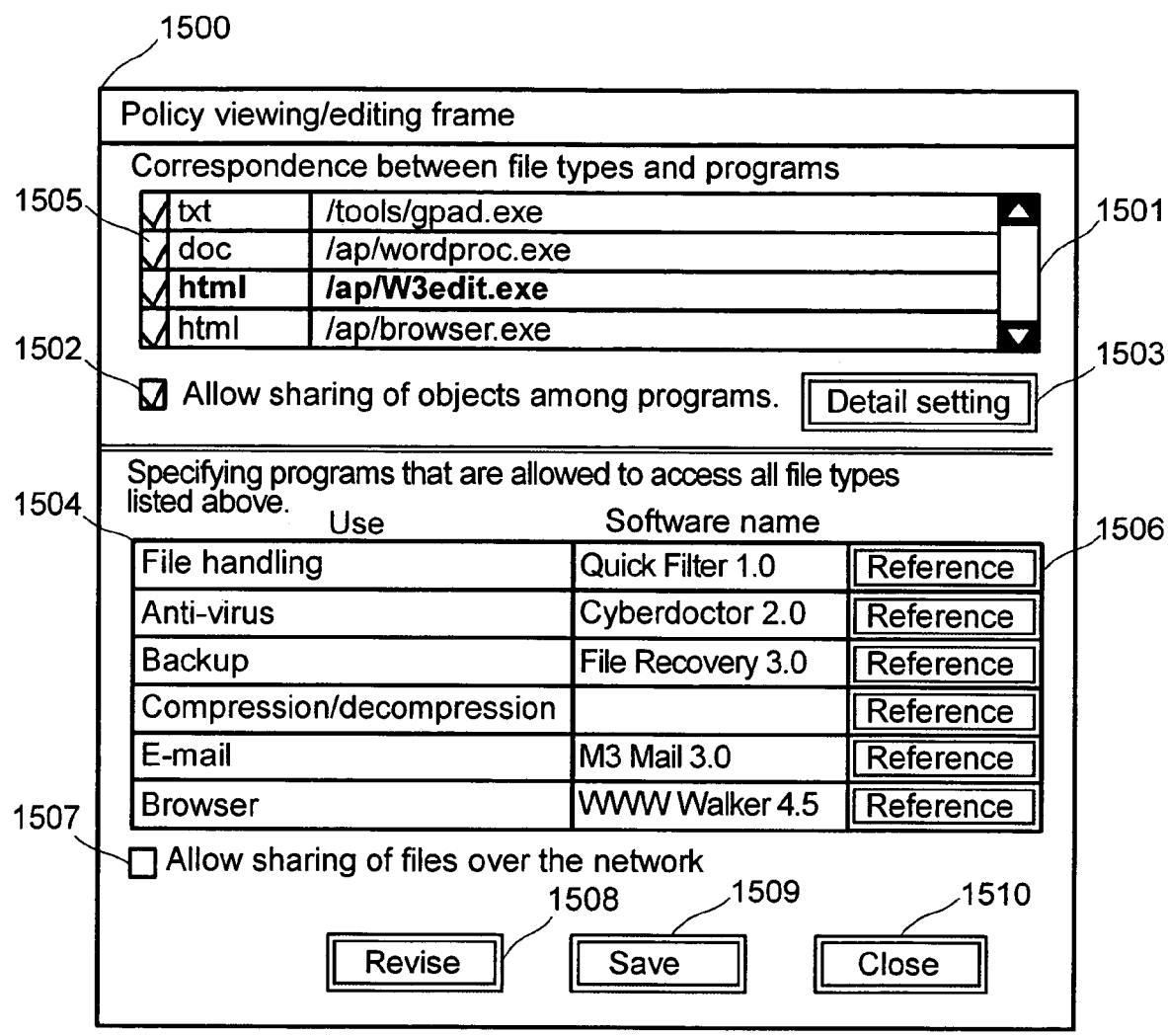
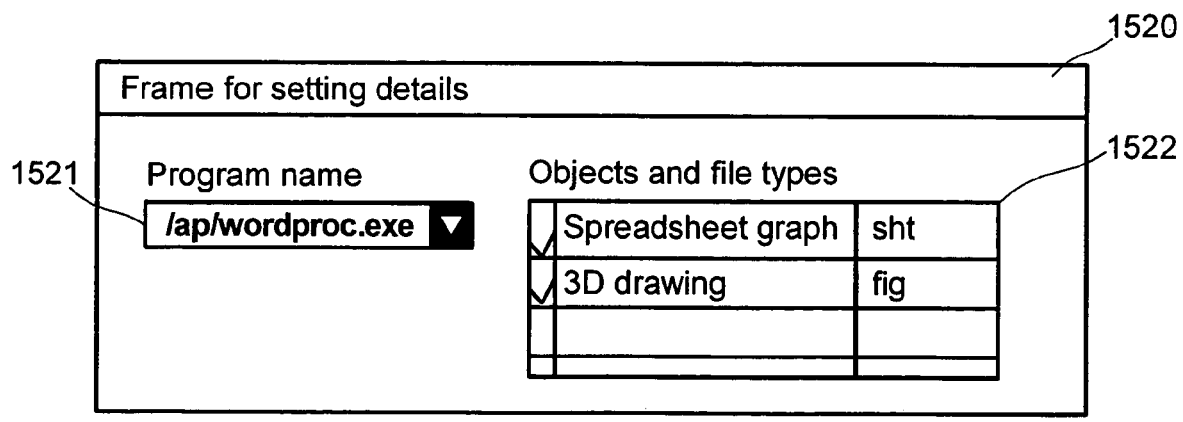

POLICY SETTING SUPPORT TOOL

BACKGROUND OF THE INVENTION

The present invention relates to a policy setting support tool used in an access control system which controls, in accordance with a set of prescribed policies, access to information assets managed by a computer system.

To protect computer resources including information, many of today's computer systems employ a combination of the user authentication mechanism provided by the multi-user, multi-task operating system and an access control mechanism based on the result of the authentication. A typical arrangement is that when accessing an information processing system on which the operating system runs, the user is required to present his/her user ID and password to its host operating system and obtain authentication.

In such an arrangement, every file managed by the information processing system is given an access control list (called a policy) as its security attribute. This list specifies, based on the user ID and the group ID, what type of access (e.g., read, write) each user is granted for the file.

Each time a user attempts to access a file through an application program, the operating system checks his/her user ID and the ID of the group he/she belongs to against the policies assigned to the target file and to the directory it belongs to, and grants access only if he/she is covered by them.

Further, to provide a stricter means of access control, such an arrangement can be expanded to require, as the information on the access requester, the identification of the application program serving as the access intermediary, in addition to the requester's user ID and group ID.

An example of such access control is disclosed in Japanese Laid-Open Patent Publication No. 2001-337864 (Document 1). It should be noted that to prevent unauthorized access, policies should be set up so as to limit access to the minimum level required to carry out the tasks or to provide the intended services.

Further, Japanese Laid-Open Patent Publication No. 2002-108818 (Document 2) discloses a method for reducing the time required to create a security policy, whereby the user creates one by selecting the one best fitting his/her purposes among a number of model or sample policies and modifying it.

In view of providing a secure environment for the use of information assets, it is critical to define policies so as to limit access permission to the bare minimum. If, however, in defining policies one is to consider the identification of the program serving as the carrier of the access request (access intermediary) in addition to the user ID and group ID, it would make the procedure tedious and lengthy, although it would realize more elaborate checking of the access right. For example, one would need to know the specifications of the software such as what data it is going to access.

If the software is composed of more than one program, the problem would become greater. Even with the method disclosed in Document 2, the user would be loaded with increased chores of studying the specifications of the software, because it is nobody but the user who can modify the sample policy so as to fit his/her purpose.

Another conceivable problem arises when the contents of the program file itself are changed because of an update to the program, there is a change in the registered information on the user or the group, or the file or the directory, which is part of the information assets, is deleted, moved, or renamed. In such an event, the registered policy may not correctly reflect the most up-to-date characteristics of the information asset any longer, which would make access control ineffective.

SUMMARY OF THE INVENTION

The present invention provides a tool to facilitate policy setting which allows the user to set up a policy, without knowing the specifications of the software used, which grants access permission only to the files and access types that are considered appropriate according to the purpose of using the computer.

The present invention also provides a tool to facilitate policy setting which, in the event of a change in the subject of access such as the user and the program or the object of access such as the files and their directory, allows the user to modify the contents of the policy in simple operation.

The present invention pertains to a policy setting support tool, which, in a computer system equipped with a mechanism of controlling access to the resources under its control based on a set of policies, facilitates the process of creating policies. The policy setting support tool creates policies based on the information prepared for various types of subject of access and the information prepared for various types of object of access. The information prepared for various types of subject of access consists of standard or recommended sample policies by type, an access log containing a log of the normal operation of the subject, and installation information including the path name indicating where the subject is installed in the computer system. The information prepared for various types of object consists of association information for each type of object, which is information on the subjects most frequently used as a means of accessing it. The policy setting support tool consists of an access control unit that monitors the operation of the subject and records it in the access log, a differential detection unit that detects the differences between the samples and the installation information, a policy creation unit that creates a draft policy out of the samples, the association information, and the differences detected by the differential detection unit, and a user interface unit through which the user views and modifies the draft policy and saves the final policy.

The policy setting support tool according to this invention automatically creates a sample policy for each piece of software and also creates a draft policy that would best suit the computer system on which a given piece of software runs, thus allowing the user to easily set up the policy in the most suitable way, without knowing the specifications of the software.

The present invention also allows the user to set up a policy, through communication with the policy setting support tool via the user interface unit, by first creating a draft policy using any combination of the standard or recommended sample policies, the association information, and the access log, revising this draft policy as necessary and appropriate, and then saving the revised version as the final one.

Since this arrangement makes it possible to create a draft policy using only the association information and/or the access log, the user can easily create a suitable policy without knowing the specifications of the software even when no sample policies are made available.

The present invention also provides a means for reducing the workload required for maintenance of policies in a computer system equipped with a policy-based mechanism for controlling access to the resources managed by it. For this purpose, such a computer system is composed of a collection of most up-to-date information on the subject and object of access, a differential detection unit which, by collating the most-up-to-date information with the policy already set up for any given piece of software, identifies the items to be modified, and a user interface unit which presents to the user the results of the processing performed by the differential detection unit and through which the user views, confirms, and revises the contents of the policy.

This arrangement makes it possible to automatically identify the items to be modified even when there has been a change in the subject or object of access, thus providing the user with a means of revising policies in simple operation.

The differential detection unit performs the checking either at regular intervals or at the demand of the user. Upon detecting differences, the differential detection unit presents them to the user via the user interface unit, whereupon he/she goes through them visually, checks whether the policy needs to be revised as suggested, revises it if necessary, and saves the final draft policy also through the user interface unit.

In this manner the user can carry out all the work associated with the maintenance of policies through the user interface unit, from checking the differences to revising the current policies and saving the new policies.

Automatic detection of differences at regular intervals relieves the user of the chore of requesting the system to detect differences, thereby realizing efficient and effective access control based on most up-to-date policies.

In a computer system equipped with a policy-based mechanism of controlling access to the resources managed by it, the present invention reduces the workload in creating policies, by maintaining association information for each object, which is the information on the subjects most frequently requesting access to it, and having such association information reflected in the creation of the policies.

This arrangement of making it possible to determine, for each type of object, what subject should be granted access not only facilitates setting up of a policy but also eliminates the need for revising the policy in the event of moving, copying, or deletion of an object, as long as it belongs to the same type, since the policy is defined for the type of object rather than for each individual object.

The present invention also provides a means of specifying subjects by purpose, i.e., a means of specifying access methods for a given object according to its purpose. For a program specified by this means, a policy is created as a subject associated with several types of objects.

Such an arrangement not only realizes more flexible policy setting than an arrangement using only association information, but also eliminates the need for revising the policy in the event of moving, copying, or deletion of an object, as long as it belongs to the same type, since the policy is defined for the type of object rather than for each individual object.

The policy setting support tool according to the present invention is also equipped with a means of being notified by the access control unit of any attempt of access violating the policy, notifying the user of the computer system managing the object about the attempted access, and taking action as directed by the user. The user can choose one of the three actions: permit all subsequent instances of such access, permit such access only this time, or deny such access. To permit all subsequent instances of such access, the user revises the policy so as to legitimize such access and notifies the access control unit of the legitimacy of the access. To permit such access only this time, the user notifies the access control unit of the legitimacy of the access without revising the policy. To deny such access, the user does not revise the policy and notifies the access control unit of the illegitimacy of the access.

Further, the policy setting support tool according to the present invention is equipped with a means of being notified by the access control unit of any attempt of access to a new type of object whose policy has not been registered, which attempt is coming from a subject associated with the new type of object, notifying the user of the computer system about the attempted access, and taking action as directed by the user. The user can choose one of the two actions: permit or deny such access. To permit such access, the user revises the policy so as to legitimize such access and notifies the access control unit of the legitimacy of the access. To deny such access the user does not revise the policy and notifies the access control unit of the illegitimacy of the access.

Further, the policy setting support tool according to the present invention is equipped with a means of being notified by the access control unit of any attempt of access coming from a subject having characteristics partly different from the information registered in the policy, notifying the user of the computer system about the attempted access, and taking action as directed by the user. The user can choose one of the two actions: permit or deny such access. To permit such access, the user revises the policy so as to legitimize such access and notifies the access control unit of the legitimacy of the access. To deny such access the user does not revise the policy and notifies the access control unit of the illegitimacy of the access.

The policy setting support tool according to the present invention having the features described above thus makes it possible to revise a policy in simple operation without affecting normal use of the computer system.

The present invention reduces the workload involved in the creation and maintenance of policies.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 shows an example of a policy 120 according to an embodiment of the present invention.

FIG. 6 shows an example of the simplified policy setting interface 600 according to an embodiment of the present invention.

FIG. 10 is a flowchart of a procedure for revising a policy using the differential detection unit 104.

FIG. 11 shows an example of a policy with suggested changes displayed in the editing box 420.

FIG. 13 shows an example of a policy file 1220 according to a second preferred embodiment of the present invention.

FIG. 14 is a flowchart of a procedure for creating a policy according to a second preferred embodiment of the present invention.

FIG. 15 shows an example of a frame for viewing and editing a policy according to a second preferred embodiment of the present invention.

DETAILED DESCRIPTION OF THE EMBODIMENTS

A first preferred embodiment of the present invention is described below with reference to FIGS. 1 through 11.

Figure 1:
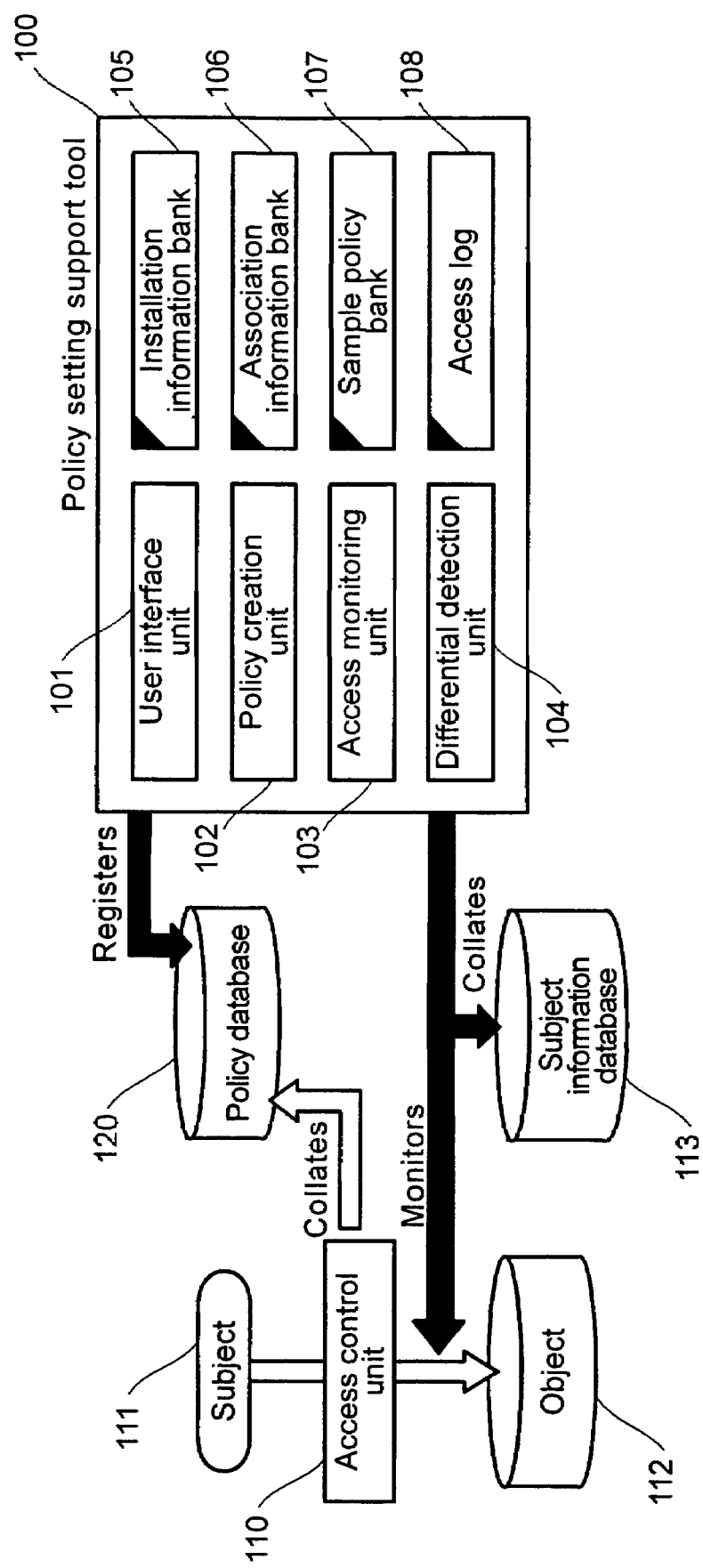
FIG. 1 shows an example of a configuration of the policy setting support tool according to an embodiment of the present invention.

FIG. 1 shows an example of a configuration of a policy setting support tool according to an embodiment. The policy setting support tool 100 is composed of a user interface unit 101, a policy creation unit 102, an access monitoring unit 103, a differential detection unit 104, an installation information bank 105, an association information bank 106, a sample information bank 107, and an access log 108.

The access control unit 110 receives an access request for the object 112 from the subject 111, determines, based on the contents of the corresponding policy 120, whether or not permission should be granted, and grants permission if the request conforms to the policy, or otherwise sends an error message to the subject 111.

Access control of this kind is implemented as a standard feature in many of today's operating systems. In most such implementations, however, the policy specifies the access-granted subjects by the identification (ID) of the user or the group the user belongs to.

In contrast, the embodiment of the present invention uses as a policy for access control not only the ID of the user or the group he/she belongs to, but also the information on the program that is involved in the access and some other information.

In the embodiment of the present invention, the subject information 113 includes the program files and the information on the user group.

The policy setting support tool 100 makes it easy to set up policies, by utilizing various information banks 105 through 107 and the access log 108, which is a record of access history from the subject 111 to the object 112. It also makes it easy to revise a policy, by consulting the subject information database 113.

Figure 2:
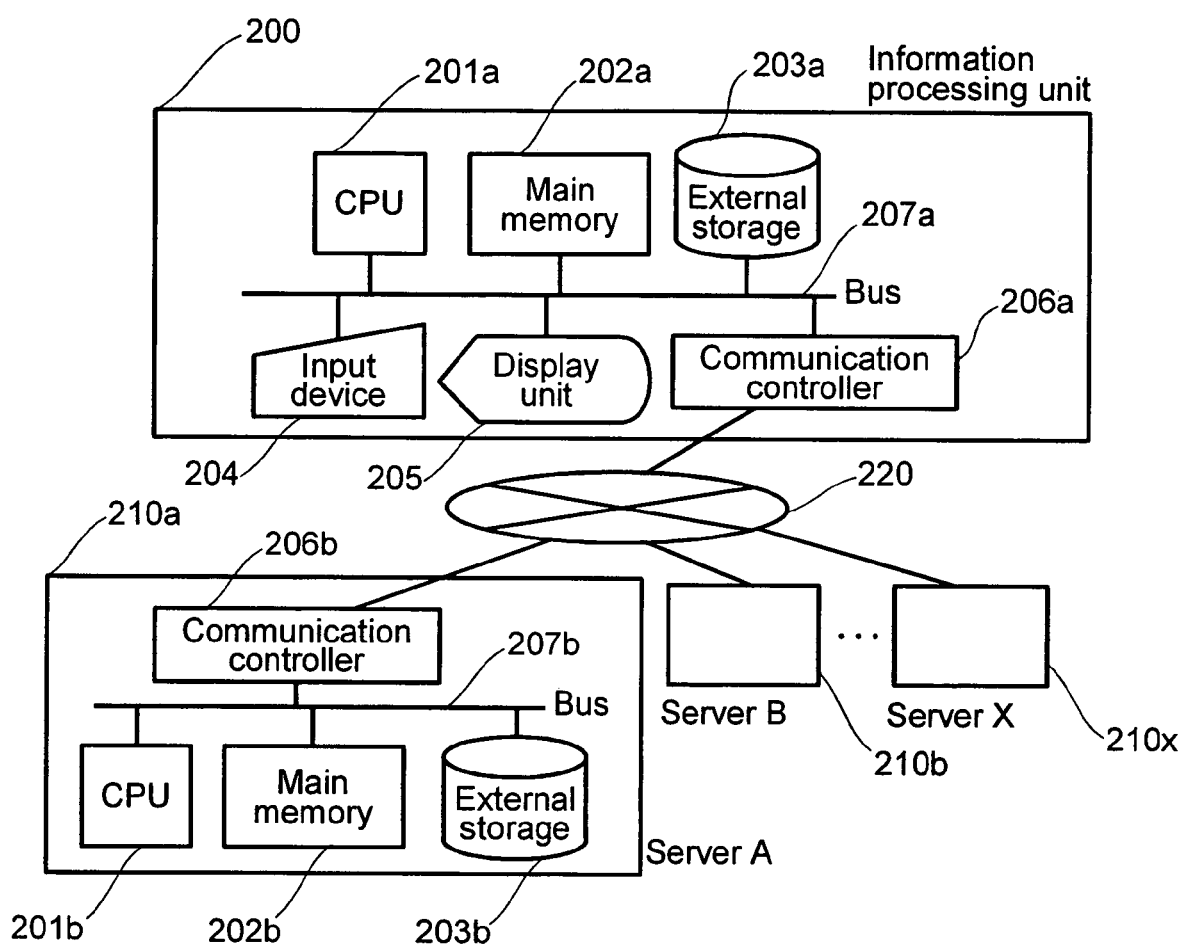
FIG. 2 shows an example of a computer system for utilizing the policy setting support tool.

FIG. 2 shows an example of a system that would be required to utilize the policy setting support tool 100. In FIG. 2, the information processing unit 200 is composed of a central arithmetic and logical processing unit (CPU) 201a, a main memory 201a, an external storage 203a, an input device 204, a display unit 205, and a communication controller 206a, all connected through communication lines such as a bus (hereinafter a bus) 207a.

The object 112, the subject information database 113, and the policy database 120 are stored in the external storage 203a and are loaded into the main memory 201a as necessary.

The subject 111 and the access control unit 110 are loaded into the main memory 201a and are executed by the CPU 201a. The access control unit 110 is usually an integral part of the operating system or otherwise is incorporated into the operating system as necessary.

Likewise, the policy setting support tool 100 is also loaded into the main memory 201a and executed by the CPU 201a.

The user interface unit 101 presents user interface frames on the display unit 205 and carries out various tasks as directed by the commands and data entered through the input device 204.

The installation information bank 105, the association information bank 106, the sample information bank 107, and the access log 108 may be stored in the external storage 203a and loaded into the main memory 201a as necessary.

The foregoing has described that part of the system configuration which is required for setting up and revising the policy database 120, the contents of which are to be processed on the information processing unit 200, using the policy setting support tool 100 running on it.

Next in order is a description of the part of the system configuration required for setting up and revising the policy database 120, the contents of which are to be processed on the server 210 that is equipped neither with an input device 204 nor with a display unit 205, from the information processing unit 200.

The server 210a is composed of a CPU 201b, a main memory 202b, an external storage 203b, and a communication controller 206b, all connected through a bus 207b. Programs are loaded into the main memory 202b and are then read out of it and executed on the CPU 201b. The communication controller 206b is used by such programs to exchange data with other network nodes through the network 220.

In the description that follows, it is assumed that the access control unit 110, which is either an integral part of the operation system or a program that can be incorporated into the operating system, is first loaded into the main memory 202b and is then executed on the CPU 201b, and further that the access control unit 110 controls access from the subject 111 to the object 112, treating as the subject 111 a program that is also loaded into the main memory 202b and then executed on the CPU 201b.

The policy database 120, the object 112, and the subject information database 113 can be stored either in the external storage 203b inside the server 210a or in an optional external storage that can be shared by other nodes on the network.

In this system configuration, the policy setting support tool 100 runs on the information processing unit 200 and the server 201a, which share the execution of its functions in a cooperative manner, while exchanging necessary data through the network 220. More specifically, the user interface unit 101, which drives the input device 204 and the display unit 205, is executed on the main memory 201a in the information processing unit 200, whereas the policy creation unit 102, the access monitoring unit 103, and the differential detection unit 104 are executed on the main memory 202b in the server 210a.

The installation information bank 105, the association information bank 106, the sample information bank 107, and the access log 108 can be stored either in the external storage 203b inside the server 210a or en optional external storage that can be shared by other nodes on the network.

This system configuration can be easily expanded so that policies can be set up and revised for a plurality of remote servers 210b through 210x from the same information processing unit 200.

FIG. 5 presents an example of a collection of policies stored in the policy database 120. As mentioned above, the policy handled by the policy setting support tool 100 according to the present embodiment of the present invention specifies, for each object, the subject that is permitted to access it by a combination of the program name and the ID of the user group.

In the example given in FIG. 5, only the program "/as/wserv.exe" running under the privilege of the user name "www" is given permission, more specifically type "R" (read only) permission, to access files having the object names "/www/pub/*". The characteristic value in FIG. 5 denotes the characteristics of the program and is typically derived from a hash function or the size of its file.

The inclusion of the characteristic value in the policy makes it possible for the access control unit 110 to protect, by checking the characteristic value, the object from access by an illegitimately modified program. "Time period" in FIG. 5 means the period of time during which access is permitted, and is usually set to "00:00-24:00" unless otherwise specified, so that it can be accessed all the time.

In FIG. 5, "Software name" refers to the name given to the software that the program constitutes. The software name is registered here for the convenience of the user, so that in revising a policy, the user can specify the program by its software name rather than by its program name. The software name, however, is ignored when the access control unit 110 checks the access right.

Figure 3:
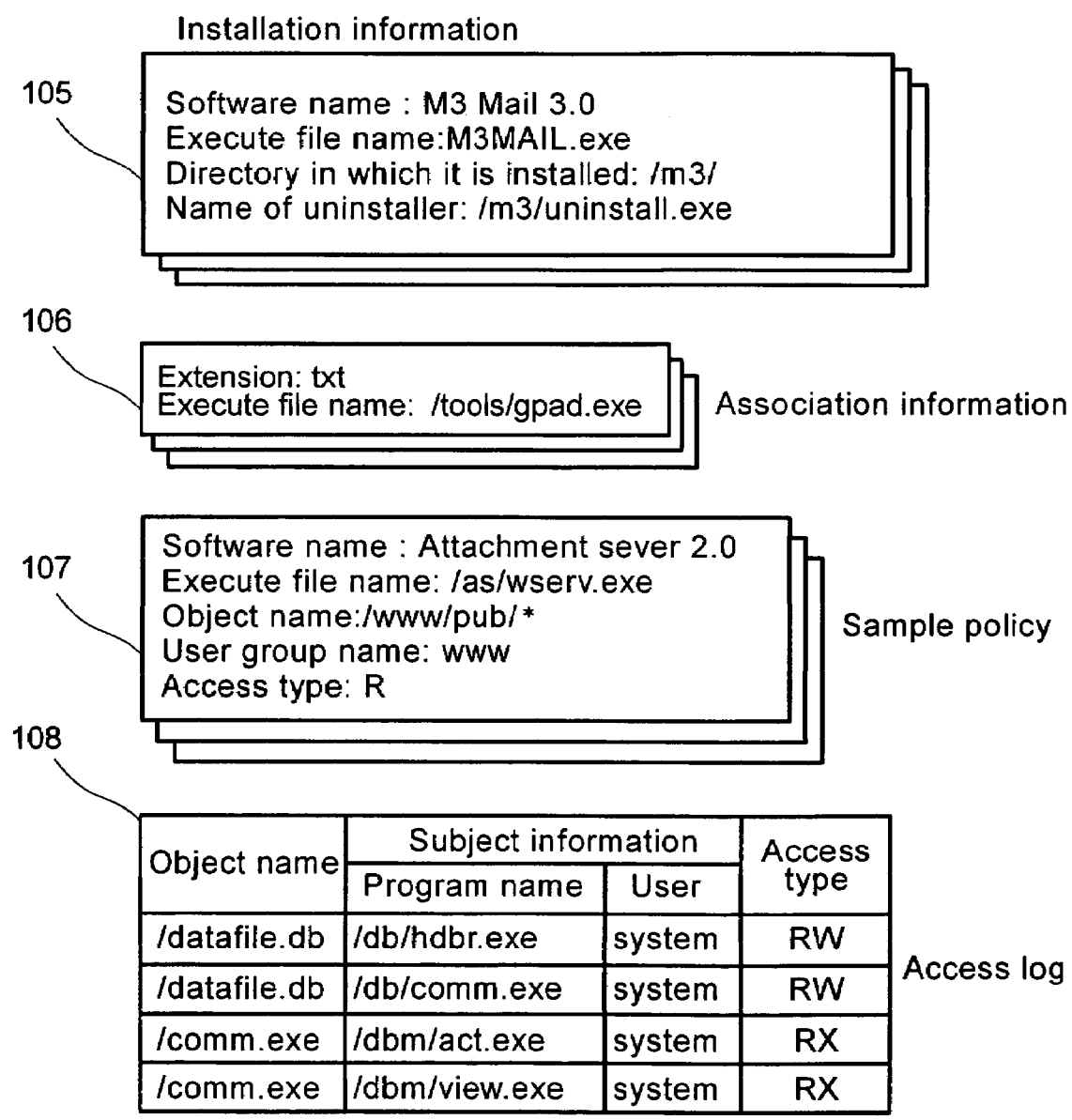
FIG. 3 shows an example of installation information, association information, a sample policy, and an access log.

FIG. 3 shows an example of the installation information 105, the association information 106, the sample information 107, and the access log 108. The installation information 105 is used to manage, for each piece of software, the information on the programs kept as the subject information 113.

The installation information 105 consists of the name of the software, the name of the execute file, the name of the directory where the software is to be installed, and the name of the uninstaller which should be used when the software needs to be uninstalled.

The example given in FIG. 3 indicates that a piece of software called "M3Mail 3.0" is installed, that its execute file, which contains the executable code of this piece of software, is called "M3Mail.exe," that this execute file is stored under the directory called "/m3/," and that the name of its uninstaller is "/m3/uninstall.exe."

Since this kind of information is often managed also by an ordinary operating system, an alternative implementation can be envisioned which utilizes the installation information managed by the operating system, instead of having it managed separately by the policy setting support tool 100 according to the present embodiment of the present invention.

The association information 106 is used to manage, for each object 112, the information on the program that is most frequently used in accessing it. The example given in FIG. 3 indicates that when accessing an object with an extension of "txt," the program with an execute file name of "/tools/gpad.exe" should be used unless otherwise specified by the user.

Since this kind of information is often managed also by an ordinary operating system, an alternative implementation can be envisioned which utilizes the association information managed by the operating system, instead of having it managed separately by the policy setting support tool 100 according to the present embodiment of the present invention.

The sample information 107 represents, for each piece of software, a standard or recommended policy. The example given in FIG. 3 indicates that in utilizing a piece of software called "Attachment server 2.0" the program whose execute file is "/as/wserv.exe" is given type R permission (read only) for access to the files with object names "/www/pub/*" as long as it is running under the privilege of the user group name "www".

The access log 108 is a log of access made from the subject 111 to the object 112 as monitored by the access monitoring unit 103. For example, the first line of the access log table indicates that for the object file "/datafile.db" an RW (read and write) type access was made, i.e., it was read and written into, by the program "/db/fhdbr.exe" under the privilege of the user "system."

Figure 4:
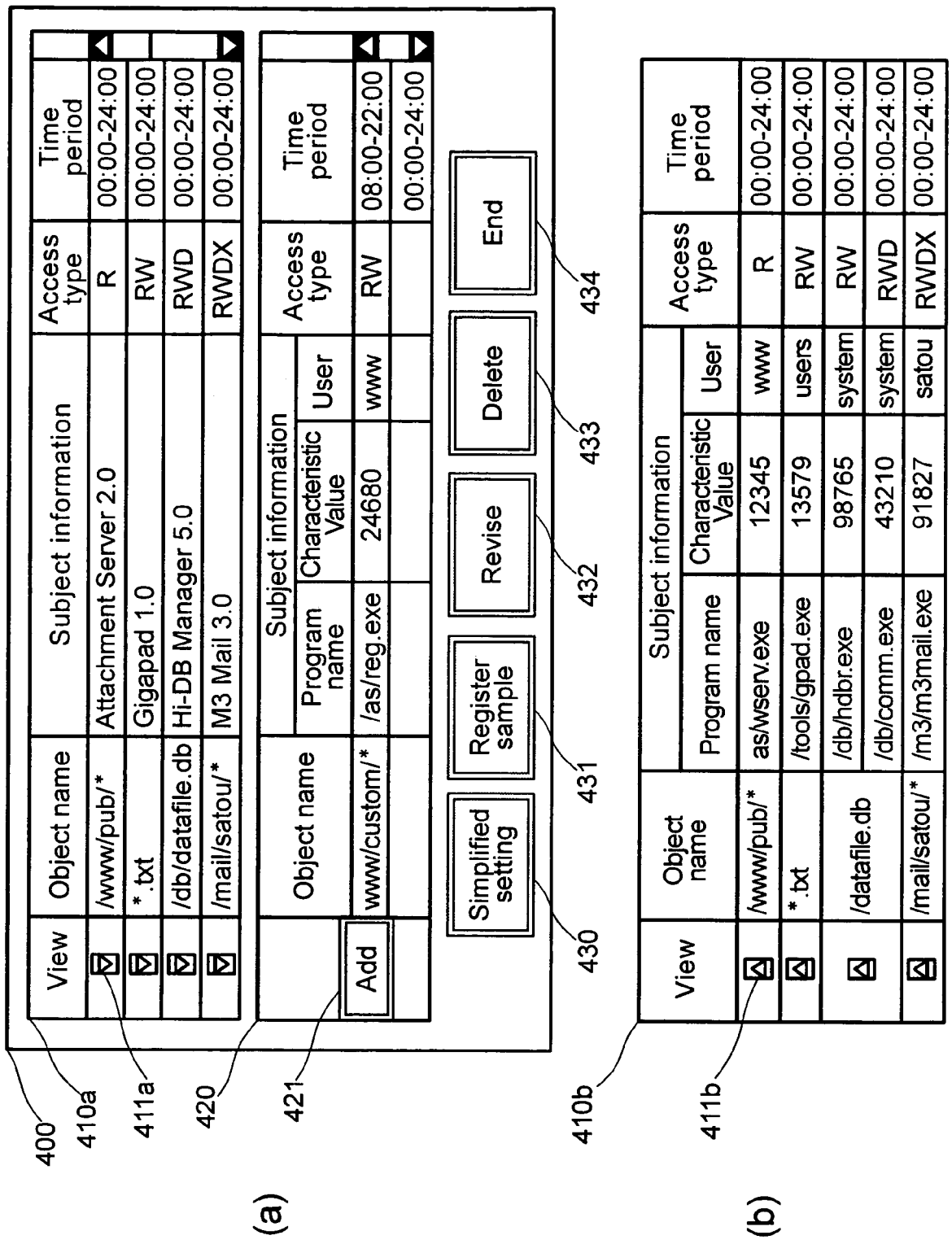
FIG. 4 shows an example of the policy setting frame 400 according to an embodiment of the present invention.

FIG. 4 presents an example of a policy setting frame 400 which the user interface unit 101 of the policy setting support tool 100 displays on the display unit 205 for its user. Through this frame, the user can view, set up, or revise the policy database 120.

On the policy setting frame 400, 410a is a box listing the policies registered in the policy database 120. Each entry of this box consists of the name of the object that may be accessed, the information on the subject that may access it, the access type showing the types of access permitted, and the period of time during which access is permitted.

In the example (a) shown in FIG. 4, the name of the software is used as the subject information, which is the same as the software name registered in the installation information bank 105 shown in FIG. 3. This arrangement makes it easy for the user to grasp the outline of the policy.

411a is the button for switching the view of the policy. Clicking this button expands the subject information column of the box to display more details of the subject, such as the program name, the characteristic value of the program file, and the user group name, as shown in 410b of the example (b) of FIG. 4. Clicking the view switching button 411b in FIG. 4(b) contracts the subject information column back to the one in FIG. 4(a) showing only the software name.

Realizing such an arrangement only requires that the correspondence between each program and its software name be maintained, by including the software name, which is stored in the installation information bank 105 (as shown in FIG. 3), in the policy database 120 as an linking identifier (as shown in FIG. 5).

Alternatively, a unique identification number instead of a software name may be assigned to each piece of software and be registered both in the installation information bank 105 and the policy database 120.

Further, if the piece of software is composed of more than one program file, all the constituent program files are given one common identification number or identifier to be registered both in the installation information bank 105 and in the policy database 120. Since the program files belonging to one piece of software are usually stored in a common directory, it only suffices to give one common identification number or identifier to all of them.

Each time the view switching button 411 (411a or 411b) is clicked, the user interface unit 101 switches, by consulting the policy database 120, the contents of the subject information to be displayed in the policy viewing box 410.

FIG. 4 shows also an editing box 420 for creating and revising policies. The editing box 420 has an Addition button 421 for adding the entries shown in the editing box 420 to the policy viewing box 410, so that it will be saved into the policy database 120 later.

The editing box 420 prepares columns for object name, subject information, access type, and time period. The user can either fill these columns individually or collectively specify them at a time using a Simplified setting button 430.

When the user selects a policy in the policy viewing box 410, the user interface unit 101 automatically displays it in the editing box 420. Thus, if the user wishes to revise part of a registered policy, he/she only needs to highlight it in the policy viewing box 410, revise its contents on the editing box 420, and then click the Addition button 421.

In addition to the Simplified setting button 430, the policy setting frame 400 has a Register sample button 431, a Revise button 432, a Delete button 433, and an End button 434.

The Simplified setting button 430 is used when the user wishes to have a draft policy automatically created by using the sample information bank 107, the association information bank 106, the access log 108, and other information as necessary, as will be explained later.

The Register sample button 431 is used to register the contents of the editing box 420 in the sample information bank 107, so that it can be used as a sample policy later.

The Revise button 432 is used to update the contents of a policy registered in the policy database 120 with the most up-to-date object information and subject information, as will be explained later.

The Delete button 433 is used to delete a policy from the policy database 120. The user only needs to highlight the one to be deleted in the policy viewing box 410 and click this button. The End button 434 is used to signal the end of the editing operation.

FIG. 6 shows an example of a simplified policy setting interface 600 that is displayed on the display unit 205 (shown in FIG. 2) when the Simplified setting button 430 is clicked. Through the simplified policy setting interface 600, the user can easily have a draft policy created using the sample information bank 107, the association information bank 106, or the access log 108.

601 in FIG. 6 is a box listing the software installed, more specifically, all the pieces of software that are installed and for which sample policies are registered. The user interface unit 101 creates this list by collating the installation information bank 105 with the sample information bank 107.

If the user wishes to have a draft policy created using sample policies, he/she only needs to check the check box 603a corresponding to the relevant piece of software, and then click the Create draft button 608.

602 in FIG. 6 is a box listing the file extensions associated with a specific program or piece of software. The user interface unit 101 creates this list by consulting the association information bank 106. If the user wishes to have a draft policy created using the associated information, he/she only needs to check the check box 603b corresponding to the relevant file extension and click the Create draft button 608.

605 in FIG. 6 is a box for specifying a program to be monitored. When the user enters the file name of the program and clicks the Start button 606, the access monitoring unit 103 starts monitoring access and recording the results into the access log 108. When the user clicks the Stop button 607, it stops access monitoring and recording.

Thereafter, by clicking the Create draft button 608, the user can have a draft policy created using the access log 108. The present embodiment assumes that the user specifies the program by the name of its file name; an alternative embodiment would be to have the user specify the program by its software name.

The draft policy thus created is displayed in the editing box 420 in FIG. 4 by the user interface unit 101. The user can then edit the contents and click the Addition button 421, whereupon the revised policy will be added to the policy viewing box 410 and at the same time stored into the policy database 120.

609 in FIG. 6 is a button used to cancel the operation on the simplified policy setting interface 600 and to go back to the policy setting frame 400 in FIG. 4.

Figure 7:
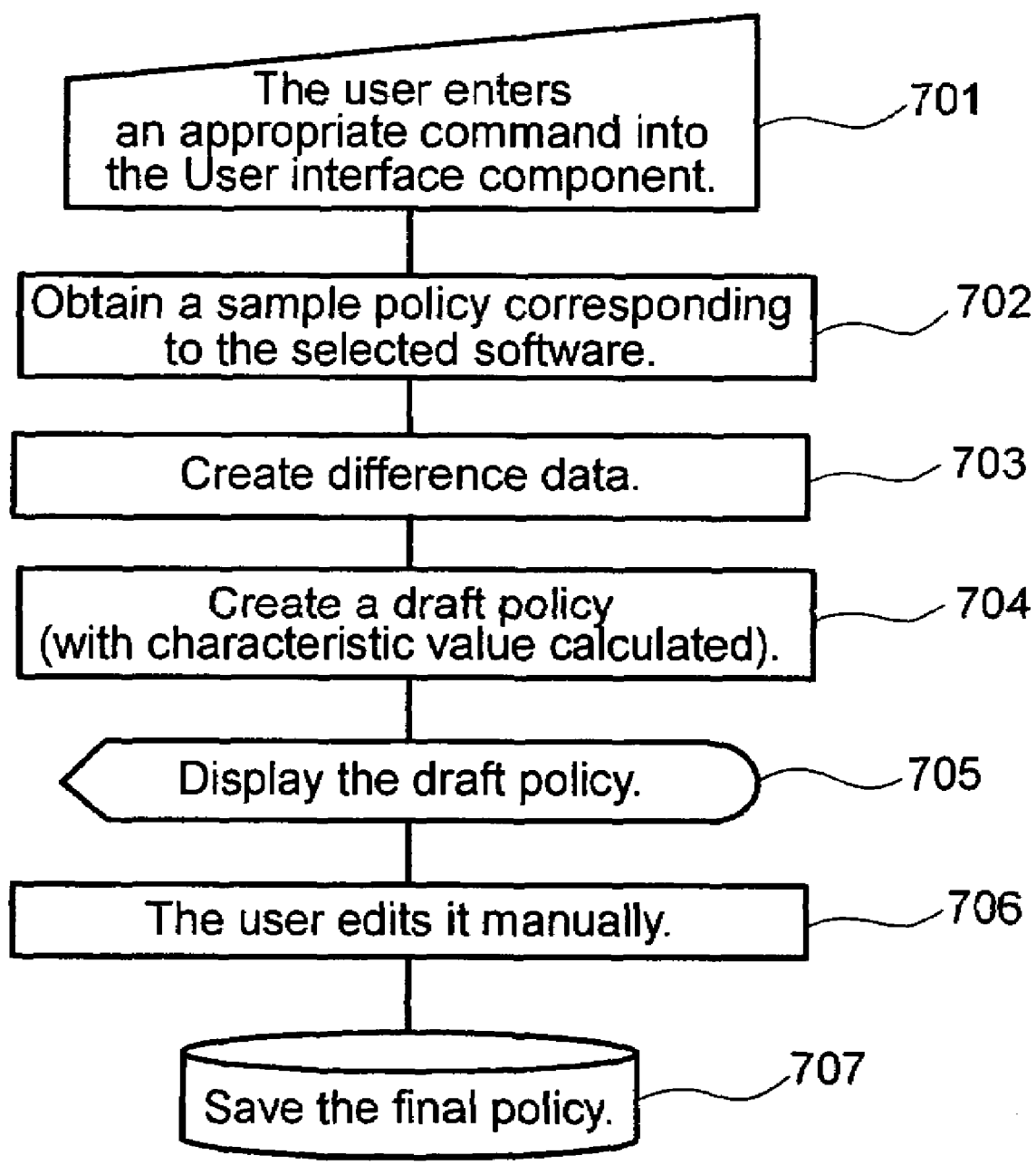
FIG. 7 is a flowchart of a procedure for creating a policy from a sample information 107.

FIG. 7 shows an example of the procedure for creating a draft policy using a sample policy taken from the sample information bank 107. In step 701 the user enters an appropriate command through the user interface unit 101, which corresponds to the process, in FIG. 6, of selecting a piece of software in the policy list 601 and clicking the Create draft button 608.

In step 702, the policy creation unit 102 obtains the sample policy corresponding to the selected piece of software. In step 703, the differential detection unit 103 creates difference data by comparing the sample policy with the subject information taken from the subject information database 113 and the object. 112.

This step is useful because, if either the directory into which the software is installed or the directory configuration is different from a standard one, the sample policy taken from the sample information bank 107 cannot necessarily be used as it is. In step 704, the policy creation unit 102 creates, based on the sample policy and the difference data, a draft policy which suits the information processing unit or the server involved.

In this step, the characteristic value of the program to be permitted is also calculated. The time period, i.e., the period of time during which access is permitted, is set to "00:00-24:00" (i.e., all day long), unless otherwise specified. In step 705, the user interface unit 101 displays the draft policy thus created in the editing box 420 in FIG. 4.

In step 706, the user revises the draft policy as necessary; for example, the user specifies the time period or changes the user group. In step 707, the final policy is saved into the policy database 120. Additional information such as the program name, the characteristic value, the user group name, and the software name is appended to the policy as part of the subject information.

Figure 8:
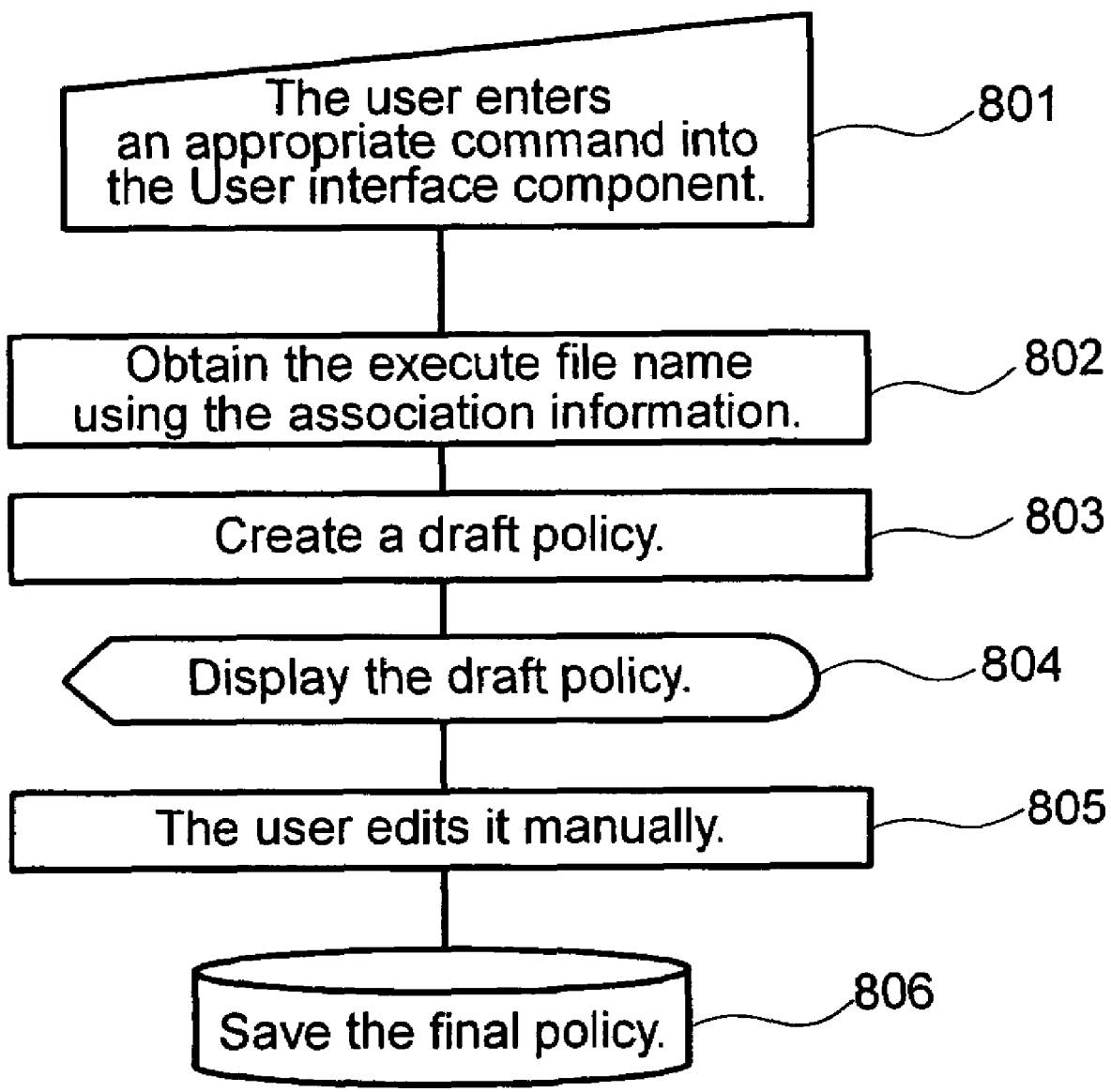
FIG. 8 is a flowchart of a procedure for creating a policy from association information 106.

FIG. 8 shows an example of the procedure for creating a draft policy using the association information taken from the association information bank 106. In step 801 the user enters an appropriate command through the user interface unit 101, which corresponds to the process, in FIG. 6, of selecting an extension in the extension list 602 and clicking the Create draft button 608.

Step 802 obtains the name of the execute file of the program associated with the extension using the association information bank 106. In step 803, the policy creation unit 102 creates a draft policy based on the information thus obtained.

The draft policy created at this point has the object name, the program name, the program's characteristic value, and the time period already filled, while the user group name and the access type are left blank, except when the operating system running on the information processing unit 200 or the server 210 is equipped with an access control mechanism that is different from the access control unit 110.

This is because the access control mechanism of an operating system usually includes the information on the user group and the access type as conditions for permitting access to each object. As an alternative implementation, therefore, the policy creation unit 102 may obtain from the operating system the user group identification and the access type and incorporate them into the draft policy.

If multiple files with the same extension have different user groups or access types, different policies are created for different objects.

In step 804, the user interface unit 101 displays the draft policy thus created in the editing box 420 in FIG. 4. In step 805, the user revises the draft policy as necessary.

More specifically, the user may change the time period during which access is permitted or change the user group. In step 806, the final policy is saved into the policy database 120.

At this point, additional information such as the program name, the characteristic value, the user group name, and the software name is appended to the policy as part of the subject information. The software name is obtained from the installation information bank 105.

Figure 9:
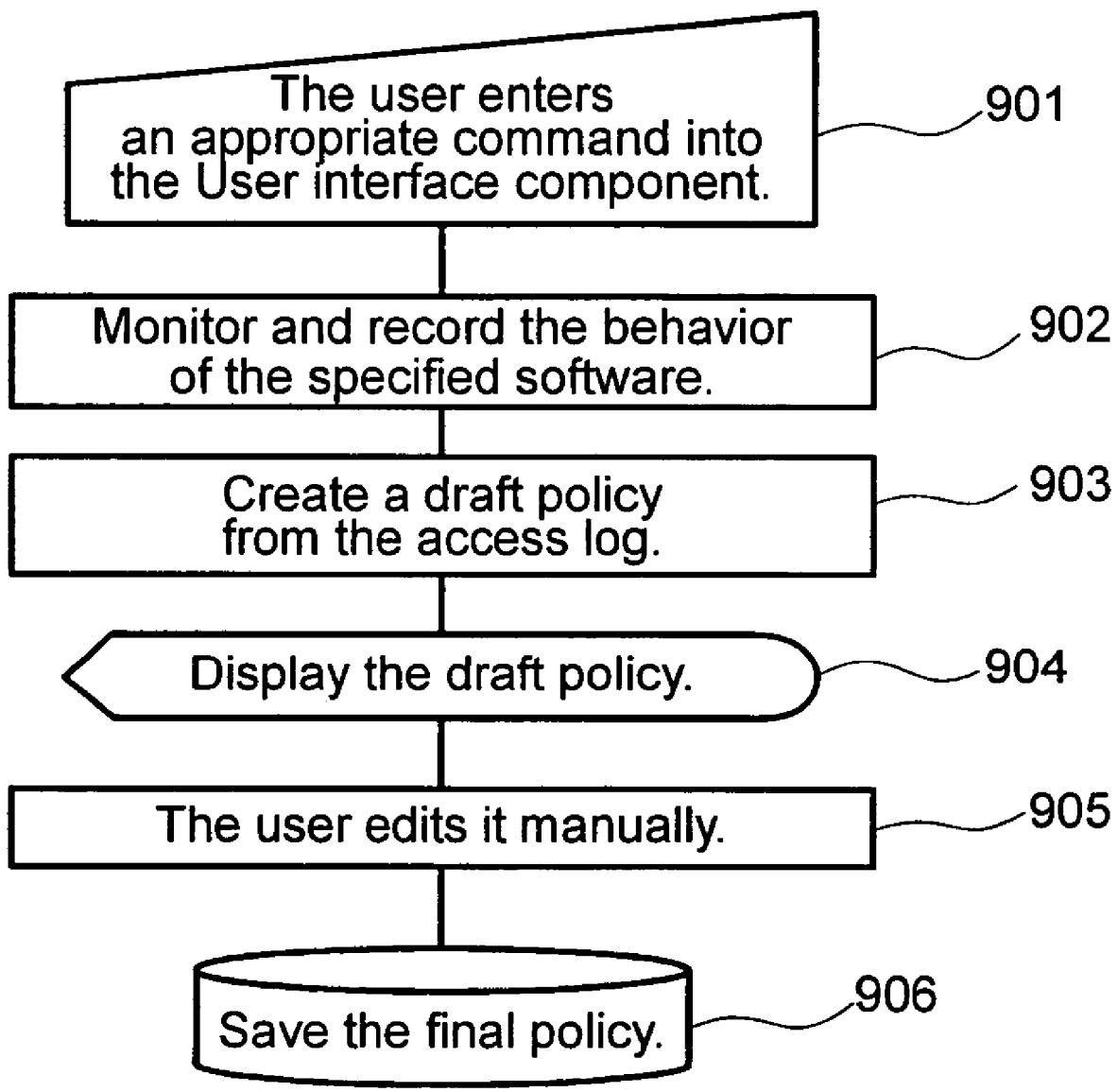
FIG. 9 is a flowchart of a procedure for creating a policy from an access log 108.

FIG. 9 shows an example of the procedure for creating a draft policy using the access log 108. In step 901 the user enters an appropriate command through the user interface unit 101, which corresponds to the process, in FIG. 6, of specifying the program in the input box 605 and clicking the Start button 606.

In step 902, the access monitoring unit 103 monitors all the file access issued from the specified program and records it into the access log 108. This monitoring continues until the Stop button 607 is clicked.

In step 903, the policy creation unit 102 creates a draft policy from the access log 108. In this process, the access types for the specified program that actually have taken place and thus have been recorded in the access log 108 are inherited, so that future access of these types will be permitted as legitimate.

This step also calculates the characteristic values of the programs that will access the specified program as subjects and includes them into the draft policy. The time period is set to "00:00-24:00" (all day) as default, unless otherwise specified.

In step 904, the user interface unit 101 displays the draft policy in the editing box 420 in FIG. 4. In step 905, the user revises the draft policy as necessary.

More specifically, the user may change the time period during which access is permitted or change the user group. In step 906, the final policy is saved into the policy database 120.

At this point, additional information such as the program name, the characteristic value, the user group name, and the software name is appended to the policy as part of the subject information. The software name is obtained from the installation information bank 105.

Overall, the user can create policies by combining and repeating the procedures shown in FIGS. 7 through 9 as necessary and appropriate.

FIG. 10 shows an example of the process carried out by the differential detection unit 104, by which any changes in the object 112 or the subject information 113 may be reflected easily on the policy database 120.

In step 1001, the user enters an appropriate command through the user interface unit 101, which corresponds to the process, in FIG. 4, of clicking the Revise button 432. Alternatively, the scheduler feature incorporated in the operating system running on the information processing unit 200 or the serve 210 may schedule the differential detection unit 104 to automatically carry out this process at regular intervals.

When any difference is detected, the differential detection unit 104 notifies the user, through the user interface unit 101, that the policy needs to be reviewed and if necessary revised to reflect the change. This way it becomes possible not to leave obsolete policies in the policy database and to ensure that access control is always based on the most up-to-date policies.

In step 1002, the differential detection unit 104 consults the policy database 120 and obtains the object name and the subject information registered in it. In step 1003, the differential detection unit 104 obtains the most up-to-date information on the object and the subject from the object 112 and the subject information database 113, respectively, and collates them with the information obtained from the policy database 120.

In step 1004, the differential detection unit 104 passes any policy that may need to be revised as a result of the collation in step 1003 to the user interface unit 101, which in turn displays it in the editing box 420 as shown in FIG. 11. The items that have changed are highlighted in the editing box 420.

In step 1005, the user checks the displayed differences in the editing box 420, and if he/she finds it necessary, revises the contents accordingly. When the user clicks the Revise button 422 in the corresponding row (step 1006), the policy database 120 is updated accordingly. Should there be a change in the characteristic value of the program although the user has not modified it, an illegitimate modification of the program file is suspected, in which case the user needs to investigate its cause instead of revising the policy to accommodate the change.

As has been explained above, the present embodiment of the present invention allows the user to create a policy in a short time by using sample policies prepared for different pieces of software, associated information, or the access log, without knowing the specifications of the software.

It also displays any changes in the information on the object or the subject in a format that makes it easy for the user to identify the differences that need to be reflected on the policy and to revise the policy accordingly. It thus ensures that access control is always based on the most up-to-date and appropriate policies.

Hereafter a second preferred embodiment of the present invention is described.

Figure 12:
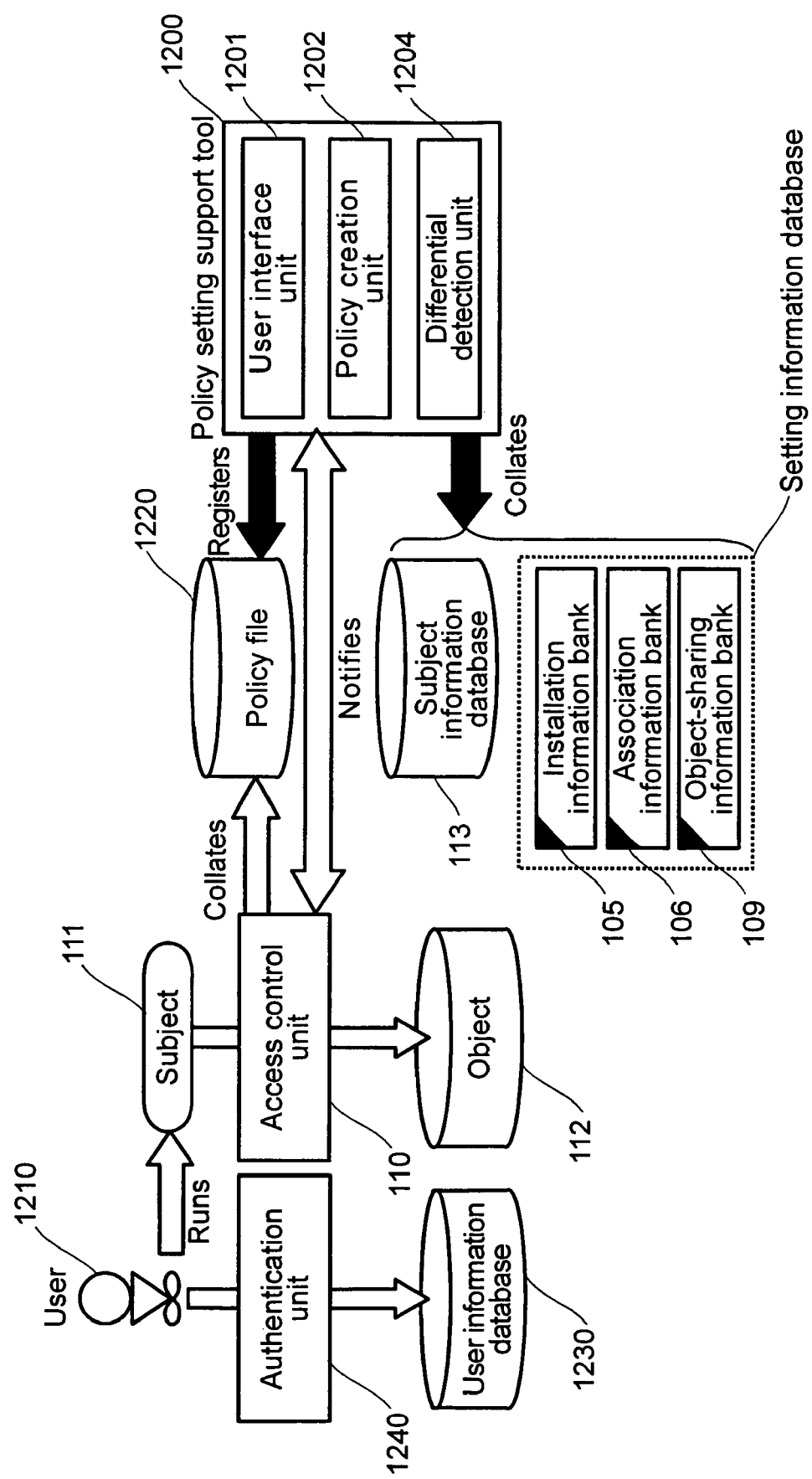
FIG. 12 shows an example of a configuration of the policy setting support tool according to a second preferred embodiment of the present invention.

FIG. 12 shows an example of a configuration of the policy setting support tool according to a second preferred embodiment of the present invention. A policy setting support tool 1200 is composed of a user interface unit 1201, a policy creation unit 1202, and a differential detection unit 1204. It creates policies using an installation information bank 105, an association information bank 106, an object-sharing information bank 109, and a subject information database 113 and registers the newly created policies into the policy file 1220. The subject information bank 113 stores, as subject information, the installed program files.

110 is an access control unit, which determines, based on the contents of the policy file 1220, whether or not to grant permission to the access from a subject 111 to an object 112, grants permission only to the access which complies with the policy, notifies a user 1210 through the policy setting support tool 1200 if the access does not comply with the policy, and depending on the user's response, grants permission or sends an error message to the subject 111.

1240 is an authentication unit, which carries out identification and authentication of the user 1210 by consulting a user information database 1230. Before accessing the object 112, the user 1210 must be recognized and authenticated by the authentication unit 1240. More specifically, the user 1210 is required to enter his/her user ID and password, for example, and if they match the information registered in the user information database 1230, is granted permission to access the object 112 through the subject 111. The subject 111 is typically a program being executed and inherits the user ID of the user 1210 who has initiated it. It is permitted to access the object 112 to the extent allowed by the access control unit 110.

Most of general-purpose operating systems also have a similar authentication mechanism coupled with an access control unit as a standard feature. In many of such arrangements, however, the policy is constructed in such a way that the subjects permitted to access a given object are specified by their user IDs or group IDs.

In contrast, the second preferred embodiment of the present invention allows the policy to specify the programs permitted to access a given object by the kind or type it belongs to.

In the second preferred embodiment of the present invention, the access control unit 110 is equipped with both the standard access control feature of general-purpose operating systems and the access control feature just described above. The standard access control feature of general-purpose operating systems uses the policy information 1300 shown in FIG. 13, which consists of file name, owner, and access right. For every file and directory, a set of access rights is established, namely, the access right for the owner, the access right for the users who belong to the same group as the owner, and the access right for the users who belong to groups other than the owner's. Each entry under this column indicates the type of access permitted in a combination of the alphabetic characters R, W, D, and X, where R denotes "read" permission, W "write" permission, D "delete" permission, and X "execute" or "change directory" permission. In general, this kind of policy information 1300 can be set up by some appropriate tool prepared by the operating system.

The policy information to be set up by the policy setting support tool 1200, on the other hand, has a different format 1310 shown in FIG. 13, which consists of file type, program name, characteristic value, and purpose. As shown in the conventional policy information 1300, access rights are generally established for each file or directory. With the policy information 1310, programs that are used for access can be specified by their file types. The idea behind is that since different files are accessed by different programs, it is more effective to specify programs by their file types than by their names or directories. The file type can be identified by the extension, i.e., the extension to the file name. For example, "*.html" represents all files that have the extension "html," i.e., HTML files. "*.*" represents all files of all types. The characteristic value is a numerical value representing the characteristics of the program, and is typically calculated using the size of the program file or a hash function.

In FIG. 13, the policy information 1300 indicates that the file "/users/satou/memo.txt" can be accessed by the user "satou" in RWD operation, i.e., can be read, written into, or deleted, whereas the policy information 1310 indicates that the same file can be accessed only through the program "/tools/gpad.exe" or through a program which is permitted to access any file of any type, i.e., a program which has under the file type column. In granting access permission, both of the policy information 1300 and 1310 are considered. Therefore, even if a user attempts to access a file (for example "/users/satou/memo.txt") using one of the programs registered in the policy file of the policy information 1310 as programs permitted to access any file of any type ("*.*"), he/she would be denied access by the access control unit 110 unless he/she is also given the appropriate access right by the policy of the policy information 1300. The second preferred embodiment of the present invention, which combines access control based on the policy information 1300 and access control based on the policy information 1310, thus realizes tighter object security management by blocking wider types of unauthorized access than the arrangement based only on the policy information 1300.

As an example of the system required in utilizing the policy setting support tool 1200, which allows policies of the policy information 1310 to be set up in simple operation, the information processing unit 200 shown in FIG. 2 is useful in the same manner as in the first preferred embodiment of the present invention.

FIG. 2 shows an example of a system that would be required to utilize the policy setting support tool. The information processing unit 200 is composed of a central arithmetic and logical processing unit (CPU) 201*a*, a main memory 201*a*, an external storage 203*a*, an input device 204, a display unit 205, and a communication controller 206*a*, all connected through communication lines such as a bus (hereinafter a bus) 207*a*.

The object 112, the subject information database 113, the installation information bank 105, the association information bank 106, the object-sharing information bank 109, the policy file 1220, and the user information database 1230 shown in FIG. 12 are stored in the external storage 203*a* and are loaded into the main memory 202*a* as necessary. Of these, the contents of the subject information bank 113, the installation information bank 105, and the association information bank 106 are the same as those in the first preferred embodiment of the present invention.

The subject 111, the access control unit 110, and the authentication unit 1240 are loaded into the main memory 201*a* and are executed by the CPU 201*a*. The access control unit 110 and the authentication unit 1240 are usually an integral part of the operating system or otherwise are incorporated into the operating system as necessary.

Likewise, the policy setting support tool 1200 is also loaded into the main memory 201*a* and executed by the CPU 201*a*.

The user interface 1201 presents user interface frames on the display unit 205 and carries out various tasks as directed by the commands and data entered through the input device 204.

FIG. 14 is a flowchart of a procedure for creating a policy using the policy setting support tool 1200. This procedure may be automatically started when the policy setting support tool 1200 is installed into the information processing unit 200 or is started by the user 1210, or may be performed by the policy setting support tool 1200 at regular intervals. Further, it may also be started when the user has clicked the Revise button 1508 in the policy viewing/editing frame 1500 in FIG. 15, as will be described later.

Figure 19:
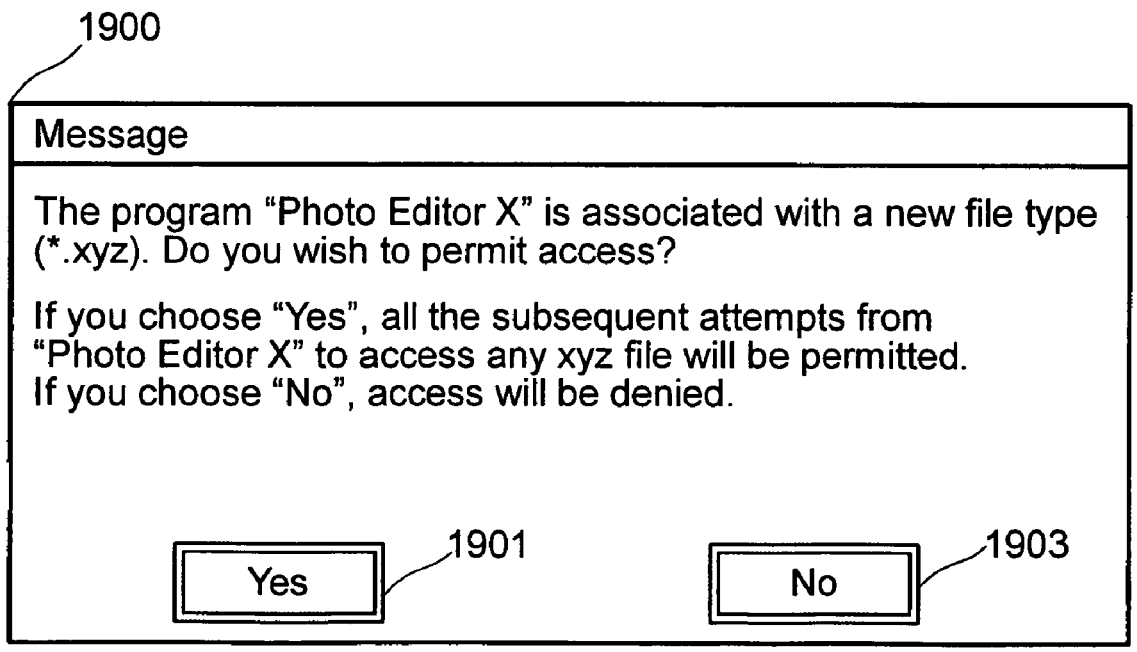
FIG. 19 shows an example of a message displayed when an access request for a new type of file has arrived.

In step 1401, the differential detection unit 1204 collates the file types registered in the association information bank 106 with those registered in the policy file of the policy information 1310, and detects the differences. If there are any file types that are registered in the policy information 1310 but that are not registered in the association information bank 106, then the information for those file types is deleted from the policy information 1310. If there are any file types that are not registered in the policy information 1310, the names of the programs (execute files) associated with those file types are obtained from the association information bank 106 (step 1402). Optionally, it can be arranged that a message box 1900 shown in FIG. 19 is displayed on the display unit 205, asking for the action of the user 1210. If the user 1210 clicks the "Yes" button 1901, the process proceeds to step 1403; if the user 1210 clicks the "No" button 1903, the process proceeds back to step 1401. Alternatively, the process may go straight to step 1403 without consulting the user 1210 as long as the program is associated with the file type.

Step 1403 calculates the characteristic value from the subject information 113 and creates a draft policy information 1310. Further, if the characteristic value of any execute file registered in the policy information 1310 is found to have been altered, the differential detection unit 1204 notifies the user interface unit 1201, which in turn displays on the display unit 205 a message box 1700 shown in FIG. 17, asking for the action of the user 1210. If the user 1210 clicks the "Yes" button 1701, the altered program will be considered legitimate and the policy information 1310 will be revised. If the user 1210 clicks the "No" button 1702, the policy information 1310 will not be revised.

In step 1405, the user interface unit 1201 displays on the display unit 205 the newly-created policy information 1310 in the format shown in the policy viewing/editing frame 1500 shown in FIG. 15. The policy created from the associated information bank 106 is included in the table "Correspondence between file types and programs" 1501.

The table "Correspondence between file types and programs" 1501 lists both the file types associated with various programs making up the operating system (also called system programs) and the file types associated with application programs running on the operating system. To make a clear distinction between the two groups of file types on the display, the policy setting support tool 1200 first obtains names of application programs from the installation information bank 105 and then obtains the types of the files associated with them from the association information bank 106. The two groups of file types are thus displayed in the table "Correspondence between file types and programs" 1501 in different colors.

The user only needs to click the Save button 1509 in order to save into the policy file 1220 the contents of the table "Correspondence between file types and programs" 1501. If at this point the user wishes not to include in the policy information 1310 any particular association, he/she only needs to uncheck the corresponding check box 1505 before clicking the Save button 1509. It should be noted that the file types thus excluded can be accessed through any program.

There may result a case in which under the control of the policy information 1310 created from the association information bank 106, some programs sharing an object with another program can no longer operate normally. An example would be a word processing software product which is incapable of spreadsheet operation but which can paste into a document created by it a graph created by a spreadsheet application in such a way that double-clicking the graph in the document automatically starts the spreadsheet application. Since the graph created by a spreadsheet application is originally stored in a file whose type is associated with the spreadsheet application, pasting it into a document created by the word processing software causes access to an unassociated file, which will be treated as unauthorized access by the policy information 1310 created from the associated information bank 106.

If such access is to be permitted, the policy setting support tool 1200 would only need to obtain, in the sequence shown, (1) the names of the programs capable of sharing an object, (2) the types of objects that such programs may copy and paste, and (3) the types of files in which such shared objects may be stored, to create a set of policies that permit access from programs of (1) to file types of (3), and to register it into the policy information 1310 together with the characteristic values of such programs calculated from the subject information bank 113. The information of (1) through (3) is collectively called object-sharing information 109. The object-sharing information 109 is included in the database maintained by the operating system to centrally manage all the setting information concerning the computer. This database also includes the collection of associated information 106 and the collection of installation information 105.

In FIG. 15, when the user checks the check box 1502 to allow sharing of objects among programs and clicks the Save button 1509, the policy setting support tool 1200 automatically creates and saves a set of policy information 1310 based on the setting information database mentioned above. Optionally, it may be so arranged that when the user clicks the Detail setting button 1503, the object-sharing information 109 is displayed in the detail setting frame 1520, through which he/she can further specify the types of objects that can be copied and pasted for each program, i.e., the file types that can be accessed.

In the detail setting frame 1520, the user only needs to select a program from the pull-down menu 1521 and to specify the types of objects the program is allowed to copy and paste, by checking the corresponding entries in the table "Object and file types" 1522. In actuality, if the user checks the check box 1502 at the time of initial setup, the box 1522, when first displayed, shows a check on all kinds of object that can be copied and pasted. The user then unchecks the kinds of object that need not be copied and pasted. For example, if the program "/ap/wordproc.exe" does not need to access "*.fig" files which contain 3D drawing objects as standard in the given application, then the user unchecks the "3D drawing" in the detail setting frame 1520. By clicking the Save button 1509, the user can have the specified policy reflected onto the policy information 1310.

The policy viewing/editing frame 1500 includes a program specifying box 1504. This frame is used to specify the programs which will be used to access various types of file but which would not function properly if their policies were to be created only from the association information bank 106. Such programs include programs for handling files such as copying, moving, and deleting a file, anti-virus software for detecting and deleting computer viruses, file backup tools for creating and maintaining backup files for recovery in the event of a disaster, and file compression/decompression tools. Further, the system or the application may send or receive various files through email or cyberspace. For convenience, the program specifying box 1504 allows the user to specify such programs by their purposes.

At the time of initial setup of the policy information 1310, none of the programs are specified. However, if there are programs provided by the operating system as standard, the policy setting support tool 1200 may obtain their names from the installation information bank 105 and display them in the program specifying box 1504. Such an arrangement reduces the workload of the user 1210 for selecting programs. For programs that are not provided by the operating system as standard, the user 1210 or the administrator of the information processing unit 200 clicks the Reference button 1506, whereupon a list of programs compiled from the installation information bank 105 is displayed, and the user can choose from it. For a piece of software not registered in the installation information bank 105, the user can directly specify its program file names. As an alternative, files received through email or cyberspace may be blocked from the program specifying box 1504 for security considerations.

Once the user has selected a program and has clicked the Save button 1509, the policy creation unit 1202 obtains the name of the corresponding program file from the subject information database 113, calculates its characteristic value, creates a policy information 1310 so that it can access any file type ("*.*"), and saves it into the policy file 1220. Alternatively, a policy information 1310 may be defined so that it can access files of the type associated with the application program, rather than any file type. Still another implementation would be to have the user select from a list of file types, which would allow the user to specify the access permission scheme for each file type according to his/her design. For certain programs, their purposes can also be specified and registered as part of the policy information 1310, so that they can be viewed on the program specifying box 1504 when the user wishes to establish policies.

If the user checks the check box 1507 for "Allow sharing of files over the network" and clicks the Save button 1509, a policy information 1310 allowing the relevant files to be shared over the network is created and saved. In this case, the programs that should be given access permission are server programs for file sharing that are part of the standard features of the operating system. Unlike ordinary application programs, such programs may not be registered in the installation information bank 105, and hence, as shown in the present embodiment of the present invention, can be handled separately from the program specifying box 1504.

The Revise button 1508 is used to revise a policy information 1310 by way of the policy creation procedure described above (steps 1401 through 1405). Clicking the Close button 1510 causes the user interface unit 1201 to finish its processing and the policy viewing/editing frame 1500 to disappear from the display unit 205.

Figure 16:
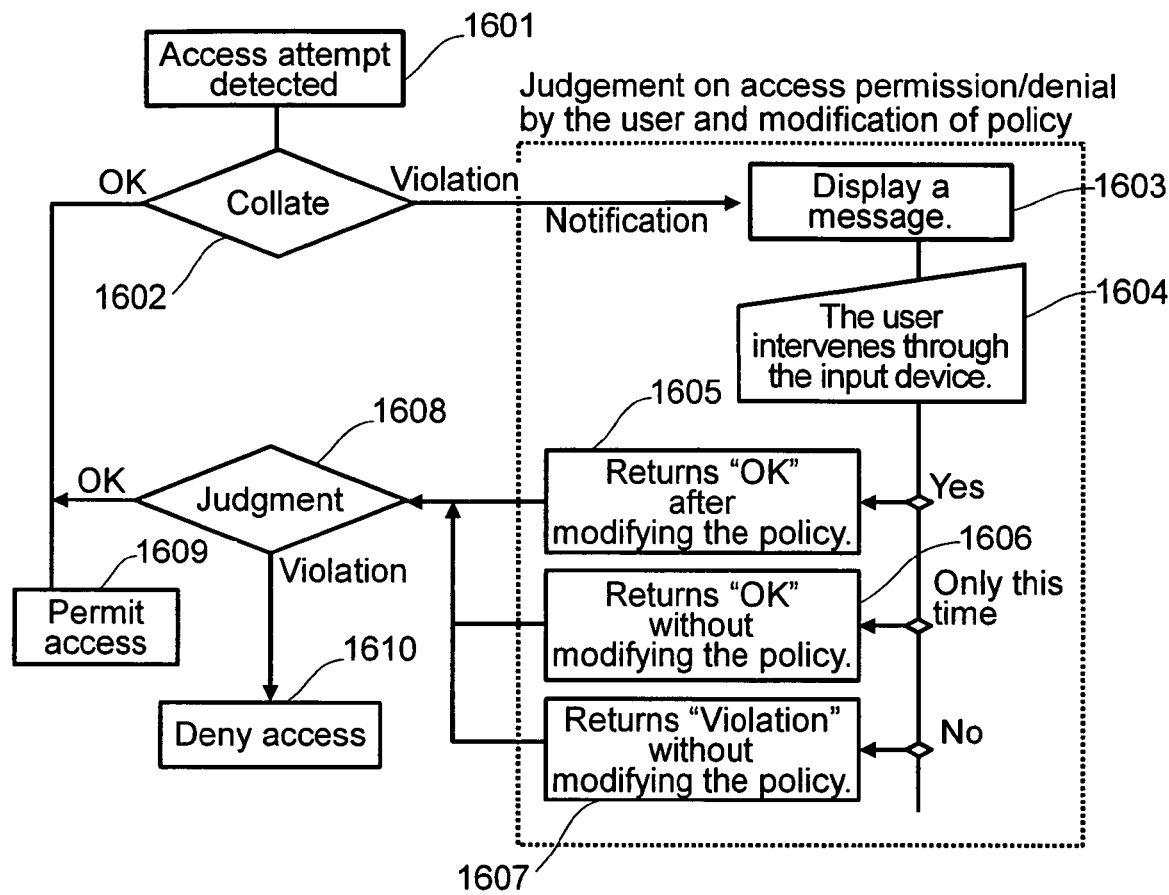
FIG. 16 is a flowchart of a procedure for the user revising the contents of a policy in conjunction with the access control unit.

A procedure for revising a policy information 1310 using the policy setting support tool 1200 in conjunction with the access control unit 110 is hereby described with reference to FIG. 16.

In step 1601, the access control unit 110 detects an access attempt from the subject 111 to the object 112. In step 1602, this access attempt is checked against the contents of the policy file 1220. Whereas the access control mechanism provided by an ordinary operating system uses only the policy information 1300, the access control unit according to the present embodiment of the present invention uses, in addition, the policy information 1310, so that only those access attempts which satisfy both policies are considered "OK" and are granted permission in step 1609.

If the access attempt does not satisfy the policy information 1300, the access control unit 110 immediately sends an error message to the subject (program) that has made the access attempt and denies access. If the access attempt does not satisfy the policy information 1310, the policy setting support tool 1200 takes control and carries out the steps 1603 and below. Step 1603 displays one of the three messages on the display unit 205 depending on the message sent from the access control unit 110: the message shown in FIG. 17 if there is a mismatch in the characteristic value of the subject (program), the message shown in FIG. 18 if there is a mismatch in the name of the subject (program), and the message shown in FIG. 19 if the object information (file type) is not registered in the policy.

Figure 17:
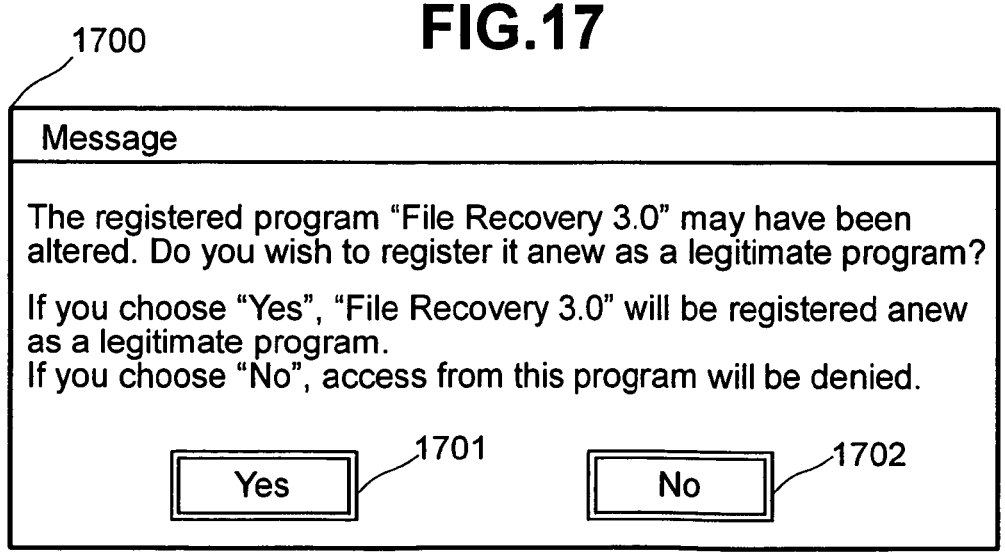
FIG. 17 shows an example of a message displayed when an access request has arrived from a program that has been altered.

FIG. 17 shows a message box 1700, which notifies the user 1210, in case the characteristic value of the program issuing the access request does not match that kept in the policy information 1310, that the program may have been altered. In step 1604, the user 1210 needs to click either the Yes button 1701 or the No button 1702. If the user clicks the Yes button 1701, the policy setting support tool 1200 revises the policy information 1310 (characteristic value) and sends "OK" to the access control unit 110, meaning that the access attempt is legitimate (step 1605). If the user clicks the No button 1702, the policy setting support tool 1200 sends "Violation" to the access control unit 110 without revising the policy information 1310, meaning that the access attempt is illegitimate (step 1607). Optionally, an Inquiry button may be added to this message box 1700, through which the policy setting support tool 1200 can send an inquiry to the supplier (developer or vendor) of the program via the network 220 shown in FIG. 2 to make sure that the program has been legitimately altered. In this case, it would be necessary to include the contact information (such as the website or email address) of the supplier of the program in the installation information bank 105 and/or the policy information 1310, so that the policy setting support tool 1200 can automatically send an inquiry to the program supplier's site when the user clicks the inquiry button.

Figure 18:
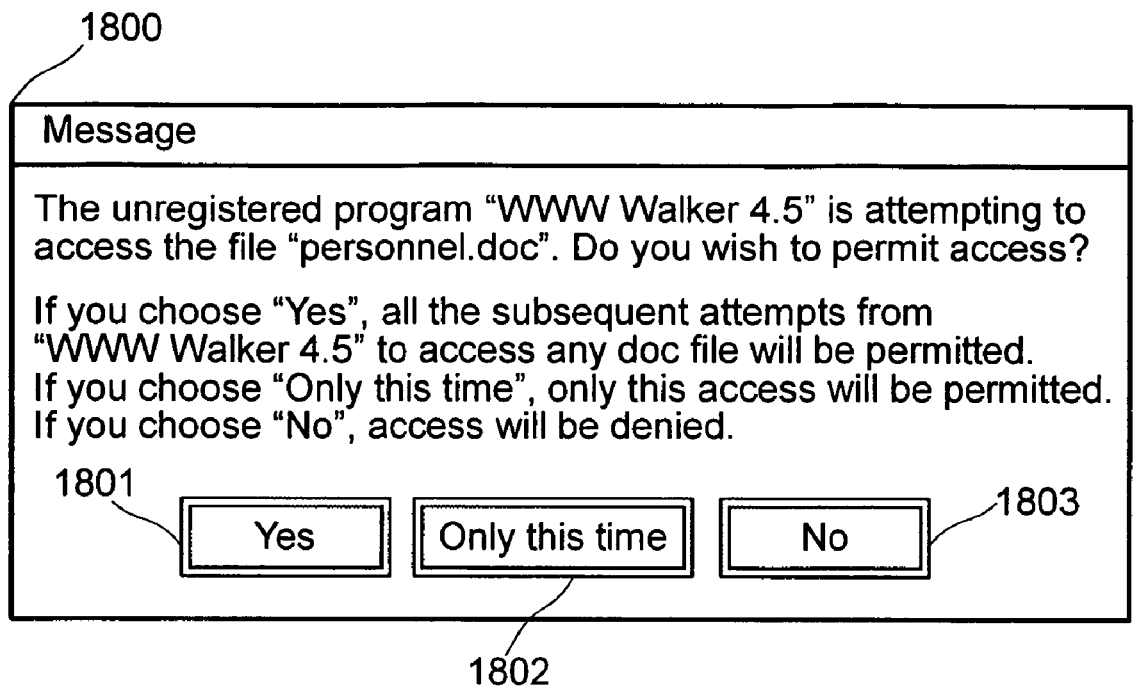
FIG. 18 shows an example of a message displayed when an access request has arrived from an unregistered program.

FIG. 18 shows a message box 1800, which notifies the user 1210, in case the access attempt has been made from a program that does not have the access right for a certain file type (such as files with extension of "doc"), that an access attempt has been made from an illegitimate program or an unregistered program. In step 1604, the user 1210 needs to click the Yes button 1801, the Only This Time button 1802, or the No button 1803. If the user clicks the Yes button 1801, the policy setting support tool 1200 revises the policy information 1310 and sends "OK" to the access control unit 110, meaning that henceforth access requests from this subject program to files of this file type (with an extension of "doc") should be honored (step 1605). If the user clicks the Only This Time button 1802, the policy setting support tool 1200 sends "OK" to the access control unit 110 without revising the policy information 1310 (step 1606), so that the current access request will be honored but future access requests of the same kind will cause the message box 1800 to be displayed again. If the user clicks the No button 1803, the policy setting support tool 1200 sends "Violation" to the access control unit 110 without revising the policy information 1310, meaning that the access attempt is illegitimate (step 1607).

FIG. 19 shows a message box 1900, which, in case the access request has been made to a file whose type is not registered in the policy information 1310, notifies the user 1210 to that effect together with the association information for this file type that has been retrieved from the association information bank 106 by the policy setting support tool 1200. Note that this message box 1900 is displayed only when the access request has come from a program that is associated with this file type. If the access request has come from a program that is not associated with this file type, then it is treated in the way as explained in the foregoing section about the message box 1800. In the message box 1900, the user 1210 needs to click either the Yes button 1901 or the No button 1903. If the user clicks the Yes button 1901, the policy setting support tool 1200 revises the policy information 1310 so as to henceforth permit access from programs associated with this file type and sends "OK" to the access control unit 110 (step 1605). If the user clicks the No button 1903, the policy setting support tool 1200 sends "Violation" to the access control unit 110 without revising the policy information 1310, meaning that the association information is invalid (step 1607).

The second preferred embodiment of the present invention described above provides an effective means of security control as discussed below. In general, programs capable of network communication such as email and browser programs should not be given the right to access all file types, since they are prone to become a security hole through which illegitimate programs can be brought in or confidential information can be inadvertently disclosed to the outside world. The policy information 1310, which the policy setting support tool 1200 creates from the association information bank 106, can limit the file types such communication-capable programs are permitted to access. In case a document file needs to be sent or received through an email or browser program, the message box 1800 will pop up when an access request is issued for that document file. The user then will click the Only This Time button 1802. This arrangement thus prevents files from being sent or received through an illegitimate or unauthorized program, without affecting normal operation.

In order to prevent the contents of the policy file 1220, particularly the contents of the policies information 1310, from being altered by unauthorized means, it is advisable to register in advance a policy information 1310 that limits the access right for the policy file 1220 to the policy setting support tool 1200, for example.

Another situation in which the second preferred embodiment of the present invention proves useful is an environment in an organization such as a company, where policy information 1310 are determined and managed by the organization and should not be altered by individual users 1210 arbitrarily. The policy setting support tool 1200 should be used only by the administrator to set up policies as determined by the organization. This can be accomplished by specifying in the policy information 1300 the operating system administrator as the only person who can access the policy file 1220, for example, as well as by limiting the programs that can access it. In this case, the information (such as password) about the operating system administrator required for authentication must be rigorously guarded against misuse by ordinary users.

To make this variant of the second preferred embodiment of the present invention more effective, the arrangement can be modified so that the procedures using the message boxes 1700 through 1900 are made available only to the administrator and also that in the event of an access attempt violating the policy information 1310, the user 1210 other than the administrator gets "Violation" or an equivalent error message in all cases. This corresponds to jumping from step 1602 to step 1610 in FIG. 16 if the collation in step 1602 yields "violation." This arrangement can be realized by including in the policy file 1220 the distinction between the ordinary user and the administrator as an environmental parameter and by modifying the access control logic in such a way that upon checking the environmental parameter the access control unit 110 inserts the procedure of steps 1603 through 1608 if the access request is coming from the administrator, or otherwise issues an error message in response to all access requests violating the policy information 1310.

Further, by having one common set of policies shared by, and installed in, multiple information processing units, the workload and chores of operation management can be reduced. In particular, since the policy information 1310 specifies the policy by the file type instead of by the path of the file, it stays unaffected by the moving, copying, or deleting of the file. Such an arrangement ensures the same effect of security control among multiple information processing units.

There can be various ways to set up a common set of policies in multiple information processing units. One is to use the copy of the policy setting support tool 1200 installed in each applicable processing unit. Another, which would reduce the workload and chores of operation management, is to use a remote server or information processing unit connected through the network 220. For example, on the information processing unit for which policies should be set up (target processing unit), a agent program, which is not explicitly shown in any of the diagrams, is executed. Through the network 220 the agent program establishes a communication link with the policy setting support tool 1200 running on a remote server or processing unit. The agent program then retrieves, from the target processing unit, the association information 106, the installation information 105, and the object-sharing information 109 and sends them to the policy setting support tool 1200. The policy setting support tool 1200 in turn creates policy information 1310 and send them to the agent program, which finally saves them into the policy file 1220 inside the target processing unit.

In the variant of implementation described above, the programs to be executed on information processing units or servers may be installed in their storages beforehand or, alternatively, be installed in their storages via a removable storage medium (not shown in any of the diagrams) or a communication medium (i.e., a network or a carrier wave constituting a network).

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A policy setting support tool for creating, in a computer system equipped with an access control unit that controls access to computer-managed resources based on policies, said policy setting support tool comprising:
   a first information database arranged by the kind of subject containing sample policies prepared as standard or recommended policies, an access log holding a history of the normal behavior of the subject, and installation information including the path to the subject installed in said computer system;
   a second information database arranged by the kind of object containing association information representing the subjects that are most frequently used to access the object;
   an access monitoring unit for monitoring the behavior of the subject and recording it in said access log;
   a differential detection unit for collating said installation information with said sample policy and detecting the differences between them;
   a policy creation unit for creating a draft policy based on said sample policy, said association information, and said differences detected by said differential detection unit; and a user interface unit for presenting said draft policy to the user, revising said draft policy as directed by the user, and saving the revised policy as the final policy.

2. The policy setting support tool of claim 1, further comprising:
   a unit for creating a draft policy from one or more of said sample policy, said association information, and said access log, in accordance with the directions given by the user through said user interface unit, and
   a unit for setting up a policy by accepting requests for revising said draft policy and saving the revised policy.

3. A policy setting support tool for maintaining, in a computer system equipped with an access control unit that controls access to computer-managed resources based on policies, said policy setting support tool comprising:
   an information database or a set of information database containing most up-to-date information regarding the subjects and objects of access;
   a differential detection unit for collating the most up-to-date information regarding the subject and object of the access retrieved from said information database or said set of information database with the policies that are already set up, and detecting the items that need to be revised;
   a policy creation unit for creating a draft policy based on the result of detection produced by said differential detection unit; and
   a user interface unit for presenting said draft policy to the user for visual confirmation and revising said draft policy as directed by the user.

4. The policy setting support tool of claim 3, wherein said differential detection unit performs the collation and detection processing at regular intervals or at the demand of the user, and upon detecting any difference, presents the detected difference to the user through said user interface unit, and further wherein the user of said policy setting support tool visually checks said difference presented to the user, determines whether the policy should be revised as presented, revises it if and as necessary through said user interface unit, and saves the final policy.

* * * * *

UNITED STATES PATENT AND TRADEMARK OFFICE
CERTIFICATE OF CORRECTION

| | | |
|---|---|---|
| PATENT NO. | : 7,380,267 B2 | Page 1 of 1 |
| APPLICATION NO. | : 10/688026 | |
| DATED | : May 27, 2008 | |
| INVENTOR(S) | : Arai et al. | |

It is certified that error appears in the above-identified patent and that said Letters Patent is hereby corrected as shown below:

Cover Page:

Item (73) Assignee,

"Hitachi, Ltd., Tokyo (JP)"

should read,

--Hitachi-Omron Terminal Solutions Corp., Tokyo (JP)--

Signed and Sealed this
Twenty-sixth Day of July, 2011

David J. Kappos
*Director of the United States Patent and Trademark Office*